(No Model.) 4 Sheets—Sheet 2.
G. T. WARWICK.
VELOCIPEDE.
No. 438,124. Patented Oct. 7, 1890.
Fig. 2.
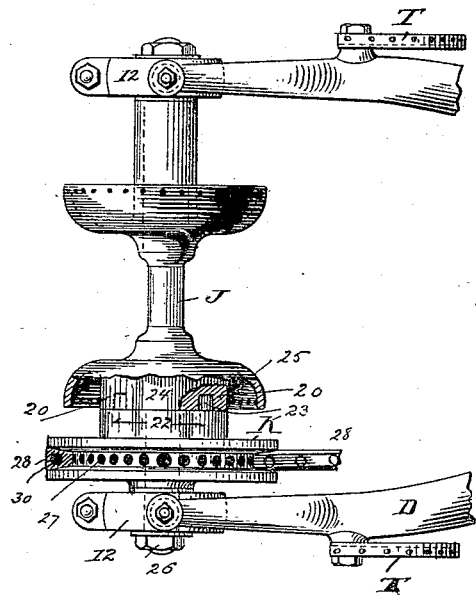
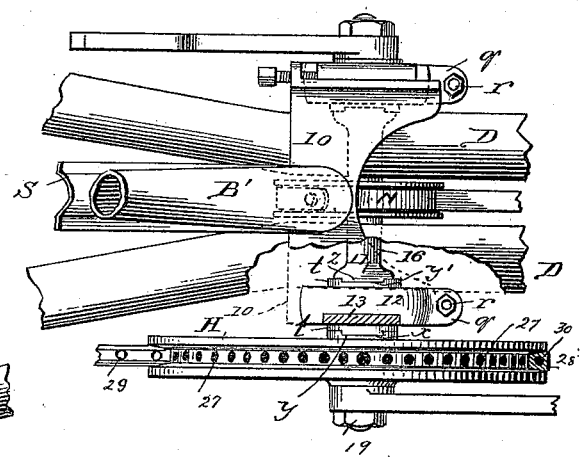
Fig. 3.
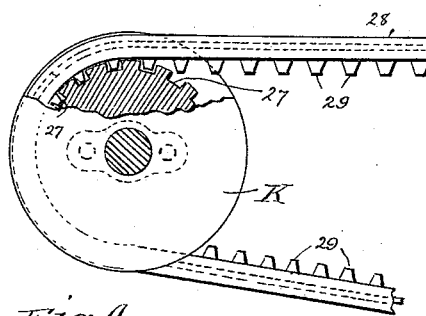
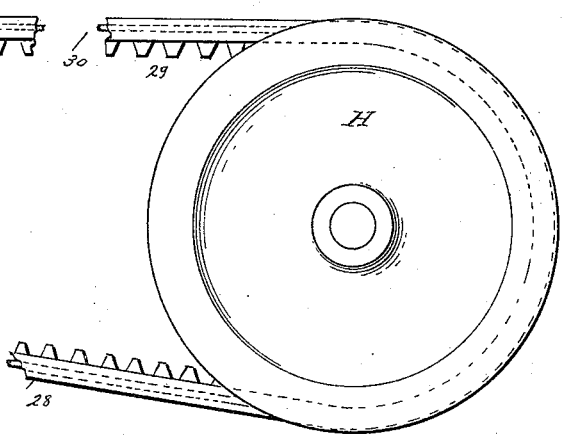
Fig. 4.
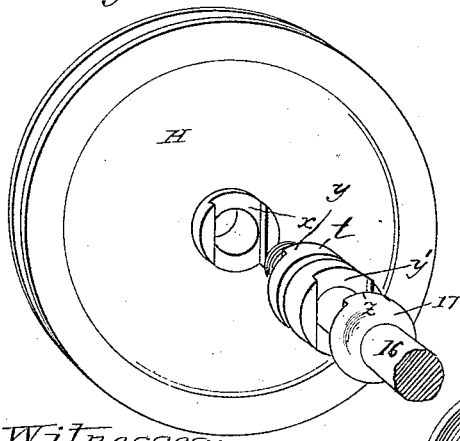
Fig. 5.
Fig. 6.
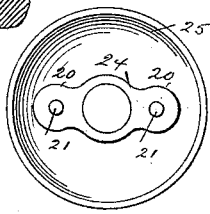
Witnesses:
J. D. Garfield
Wm. F. Bellows
Inventor,
Geo. T. Warwick
By Chapin
Atty's.

(No Model.) 4 Sheets—Sheet 3.

G. T. WARWICK.
VELOCIPEDE.

No. 438,124. Patented Oct. 7, 1890.

Witnesses:

Inventor,
Geo. T. Warwick,
By Chapin
Attys.

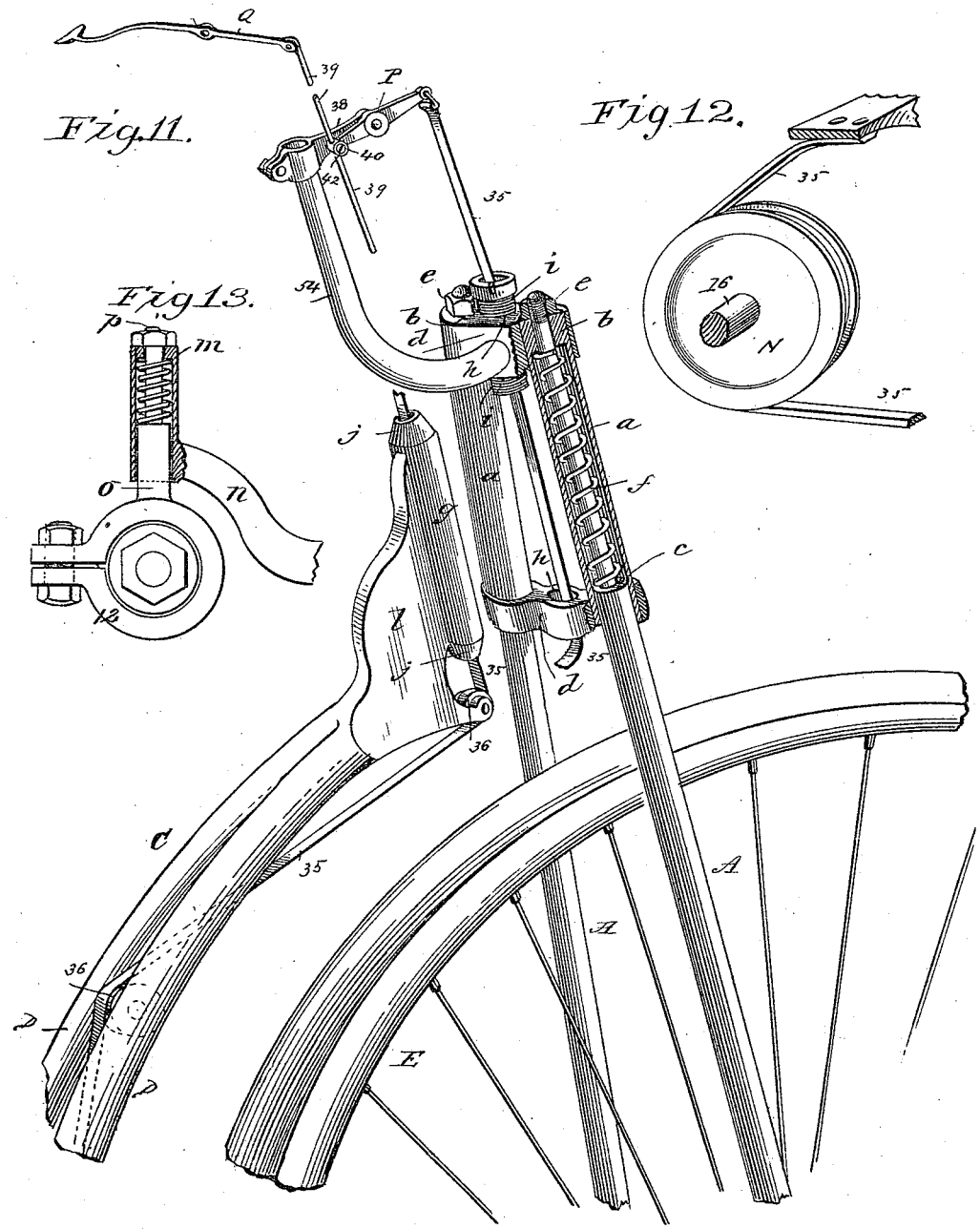

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

VELOCIPEDE.

SPECIFICATION forming part of Letters Patent No. 438,124, dated October 7, 1890.

Application filed February 21, 1889. Serial No. 300,744. (No model.)

*To all whom it may concern:*

Be it known that I, GEORGE T. WARWICK, a subject of the Queen of Great Britain, residing at Springfield, in the county of Hampden and State of Massachusetts, have invented new and useful improvements in Velocipedes, of which the following is a specification.

This invention relates to that class of velocipedes known as "Safety bicycles;" and the invention has for its object the improvement of the construction of machines of the class named, whereby they are most easily propelled and are most convenient, cheap, and durable; and the invention consists in the construction and combinations of parts, as will be hereinafter described, and pointed out in the claims.

Figure 1:
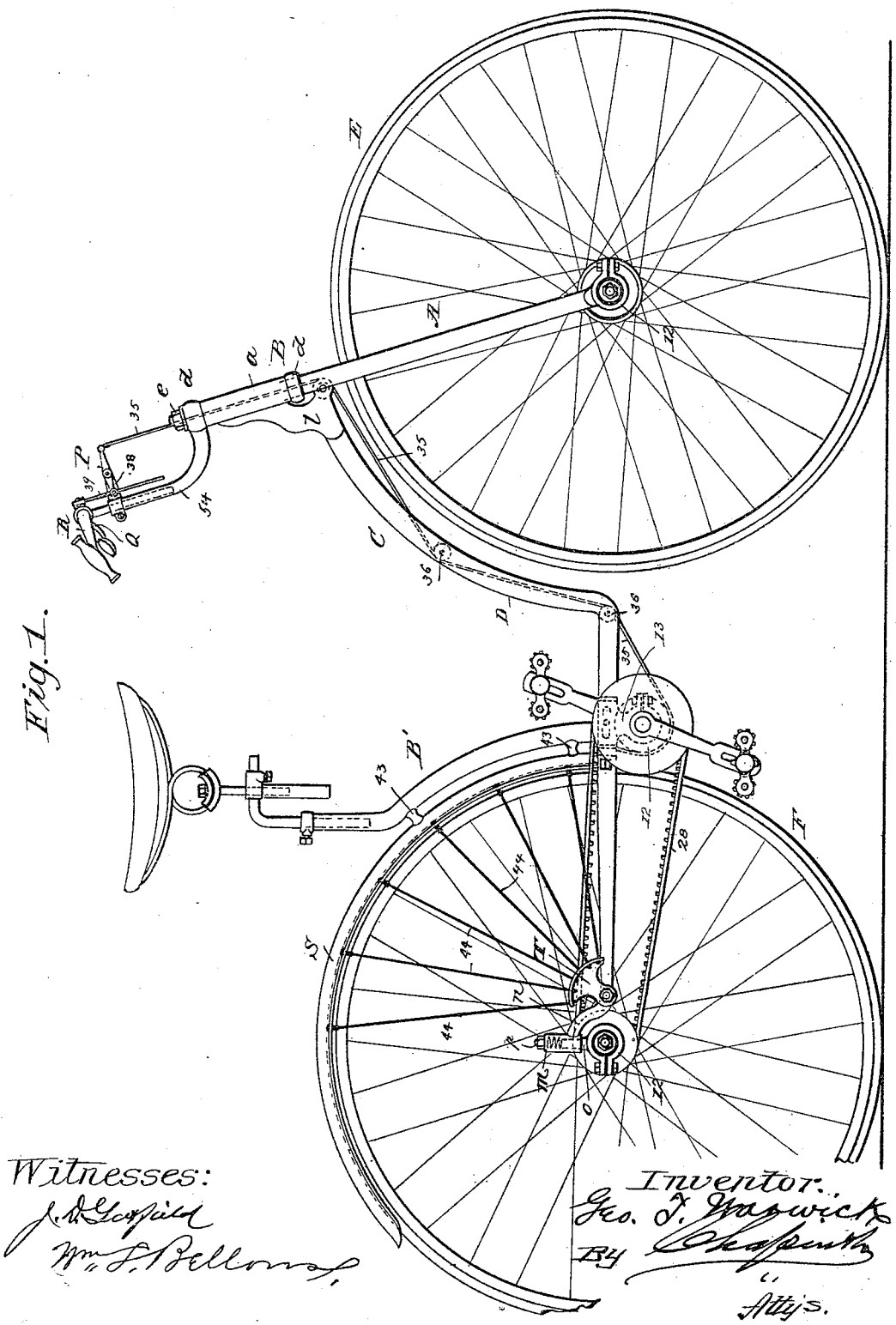
Figure 7:
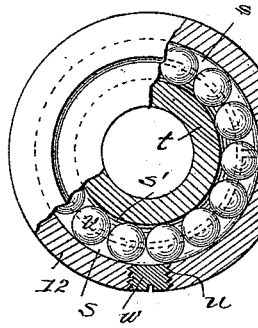
Figure 8:
Figure 9:
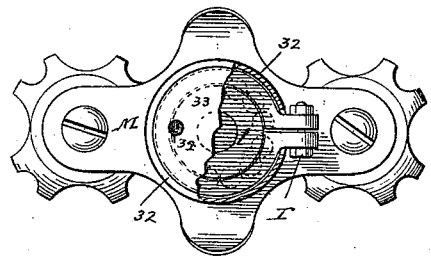
Figure 10:
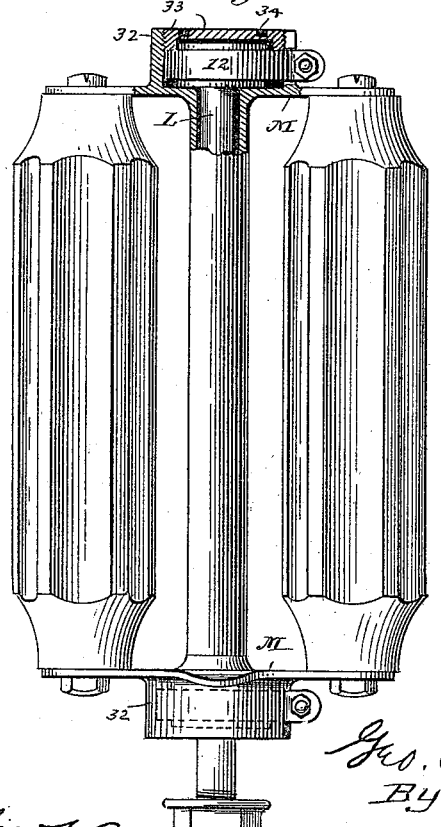

In the accompanying drawings this invention is illustrated, and Figure 1 is a side elevation of a Safety bicycle in which the present improvements are comprised. Fig. 2 is a plan view, on an enlarged scale, of an intermediate and the rear portion of the frame, the sprocket mechanism, and the rear wheel-axle, with some parts broken away and in horizontal section for clearer illustration. Fig. 3 is a side elevation of the sprocket-wheels and the driving-connection therefor. Figs. 4, 5, and 6 are views in detail of parts of the sprocket mechanism to be hereinafter referred to. Fig. 7 is in part a side view and in part a central vertical section of an improved ball-bearing employed in the herein-described bicycle, and Fig. 8 is a cross-section of the same on line 8 8, Fig. 7. Fig. 9 is an end view of an improved pedal with parts of the end casing broken away. Fig. 10 is a plan view of the pedal with parts at one end thereof in central horizontal section. Fig. 11 is a perspective view of a portion of the front fork-head and the upper part of the backbone detached therefrom, and also brake mechanism applied on and with relation to said parts; and Fig. 12 is a perspective view of the brake-wheel and a portion of the flexible brake strap or band. Fig. 13 is a detail view of the bearing-connection for the rear wheel and fork.

The front fork and fork-head B of the machine comprise a pair of nearly-parallel tubes $a$ $a$, having in their upper ends walls or plugs $b$ axially apertured, said tubes being united at the upper and lower portions thereof by connecting cross-bars $d$, and the fork-legs A consisting of rods or tubes having their upper ends necked down, forming shoulders $c$, and passed within the sockets in said tubes and loosely through the apertures in their end walls, receiving nuts $e$ at their screw-threaded projecting upper ends. Spiral springs $f$ are coiled around the upper end of said fork-legs, bearing between the upper end walls of the socket-tubes and the shoulders $c$ in the fork-legs. The stem or center pin $g$ of the backbone C is supported for a partial rotary motion in the connecting cross-bars for the socket-tubes. Vertical openings $h$ $h$ are formed through said cross-bars midway of the tubes $a$, in the upper of which is fitted a threaded nipple $i$ for screw engagement.

The backbone-stem $g$, having the tapered ends $j$, as usual, is engaged with the fork-head by screwing the nipple upwardly, placing the tapered lower end of the said stem $g$ in the lower cross-bar opening $h$ and keeping the axis of the stem in the center line of the thimble. The latter is screwed down to a bearing by its tapered opening on the upper tapered end of the backbone-stem.

The spiral springs $f$ are intended to be of sufficient stiffness to support the weight of the backbone and the load thereon, but to yield to sudden or excessive shock against the forward wheel that would be liable to be transmitted through the front fork-legs to the backbone.

The frame C of the machine consists of two tubes D D, ranging parallel or nearly parallel with each other, curved at their forward ends to conform to a portion of the circumference of the front wheel, and by their forward extremities they are brought together and united to the neck-piece $l$ of the backbone. The intermediate portions of the backbone-tubes extend horizontally in a plane about coincident with the axes of the wheels E F, being more separated by their rear portions forming the rear wheel-fork, and on their extremity each is upwardly and rearwardly curved, as at $n$, and provided with a vertical hub m, standing in a vertical line at right angles to the rear wheel-axle and over the bearing therefor. Each vertical hub m is axially socketed, and has an upper wall with a central aperture therethrough.

The bearing-case 12 for the rear-wheel ball-bearing is provided with a vertically-extending stud o, the upper portion of which is necked down to form a shoulder, and said portion of the decreased diameter is extended through the aperture of the upper hub-wall, a spiral spring being interposed between the shoulder on the stud and the upper and end wall of the hub. A nut p is screwed onto the projecting upper end of the stud. In a substantially similar manner as for the front wheel, shock on said rear wheel through the described connection with the backbone is cushioned and not imparted to the backbone.

At their intermediate portion the backbone-tubes are united by a yoke 10, on which the saddle-post B' is supported, and in which yoke longitudinal grooves are formed, in which are adjustably supported and guided the upper ends of the supporting-arms 13 for the boxes 12 for the sprocket-wheel shaft or axle 16, substantially as shown and described in an application for Letters Patent of the United States filed by me January 4, 1889, Serial No. 295,401. The said bearing-box 12 for the sprocket-shaft, supported on the lower ends of the arms 13, is of annular form, (see Figs. 7 and 8,) split at one side and extended in lugs q q, slightly separated, through which is passed a headed bolt r, to act with a nut to draw the legs together and contracting the diameter of the said box. This annular box 12 is provided on its inner wall with an annular groove s of semicircular transverse contour. The inner portion of the bearing is formed by a journal-collar t, to be secured on the axle, having in its periphery a groove s' of semicircular contour, corresponding to the groove s in the annular box 12.

The box is bored through its wall with a hole u, large enough to permit the passage therethrough of the hardened balls v to and into the annular chamber of the bearing therefor. The said hole, after the balls have been entered into said bearing-chamber, is closed by a plug w, having preferably a screw engagement with the side walls of said hole, its end being of arc shape, to form, when in place, a surface continuous with that of the annular groove in the box 12. Before forming the groove in the said box 12 the said hole is bored and tapped and the screw-plug fitted therein. The groove is then formed in the periphery of the box and in the end of the plug, and on the outer surface of the box 12 a mark is formed to register with the screw-driver slot in the said plug, and on replacing said plug, after its being removed for the insertion of the balls into the case by the registering-marks just mentioned, the plug may be properly inserted, so as to lie by the surface of its inner end flush and continuous with that of the annular groove. The wearing away of the bearing-surfaces is compensated by tightening up the bolt r in the bearing-lugs.

The journal-collar for each end bearing of the sprocket-wheel axle 16 is provided on its one end with a rib y and on its other with a groove y'. Each collar by its grooved end engages with a rib z on the hub or enlargement 17 of the axle, whereby it is caused to turn as one therewith, and with the rib y on the outer end of the journal-collar engages the groove x on the hub 17 of the forward sprocket-wheel H. A nut 19, screwing on the outer end of the axle against the hub of one pedal-crank placed thereon, forces and maintains the journal-collar t firmly against the axle-hub 17, the sprocket-wheel hub firmly against the end of the journal-collar, and each against any endwise movement, and from the rib and groove interlocking of said parts, as described, on the turning of the axle through the crank, said journal-collar and sprocket-wheel are moved therewith.

Of course, if desired, where a rib is formed on the parts described a groove may be formed instead, the rib being correspondingly formed on the adjacent part.

A similar form of ball-bearing to that above described is employed in this machine for the front and rear forks, and also at each end of each pedal-shaft.

The rear sprocket-wheel K, secured on the rear wheel-axle J, has its hub provided with flat-faced lateral extensions 22 22, from which studs 23 project parallel with the axis of said wheel and have an engagement with the holes 21, formed in the solid portion 24 of one of the cup-shaped wheel-hubs 25. (See Sheet 2 of the drawings.)

The rear sprocket-wheel is held in place and against endwise movement by the rear fork-bearing and nut 26 on the end of the rear wheel-axle.

The sprocket-wheels and their driving-connection are of a novel construction, each sprocket-wheel having radial holes 27 in its periphery at suitable intervals, and the flexible driving-connection 28 being provided on its inner side with studs 29, evenly separated, corresponding with the separation of the sprocket-wheel holes. The sprocket-wheel is by its periphery preferably flanged at each side of the holes. The sprocket-connection is formed of a band of rubber having a cord or other stretchless core 30, and the studs are of metal molded or otherwise suitably secured on the band.

The ball-bearing for each end of the pedal shaft L is inclosed within a hub-casing 32 on each end of the pedal-frame M.

The inner circular wall of each casing 32 outside of the outer end of the ball-bearing is screw-threaded, in which engages a closing-plate 33, having a screw-threaded periphery, and by which plate dust is prevented from entering the ball-bearing, particularly at the circular line of contact between the inner journal-collar and the outer box 12 thereof. Holes 34 are formed in the face of the plate, whereby it may be turned by a spanner.

A brake-wheel N is secured on the middle or other suitable portion of the sprocket-wheel shaft 16, around the under portion of the periphery of which is passed an intermediate portion of flexible band 35, of thin metal, leather, or other suitable material, it being secured by its rear end to the yoke 10 or other fixed part of the machine-frame. Said flexible band from the said brake-wheel extends forward, guided by sheaves 36, mounted on the backbone members, thence passes upwardly through the stem $g$ of the backbone, which is axially hollow, to an engagement with the forward and outer end of a lever P, intermediately pivoted on a forwardly-projected arm 38, secured on the steering-post 54 of the fork-head.

Q represents a horizontal lever intermediately pivoted on and ranging generally parallel with the handle-bars R, being provided at one end with a handle-knob and by its other secured to a connecting-rod 39, which in turn is by its lower end connected to the rearmost end of said pivoted lever P. By forcing the knob end of said lever upwardly through the connections described the flexible brake-band is upwardly drawn and caused to peripherally bind with a greater or less degree of friction on the sprocket-shaft brake-wheel. The engagement of the connecting-rod 39 with the end of lever P is an adjustable one, and made by forming a hole through and across the axis of the hub 40 on the end of said lever, through which hole the connecting-rod is passed and held by the set-screw 42. Any stretch in the band or wear in the parts or adjustment whereby the brake may be operated by a greater or less movement of the brake-lever may be provided for by the connection just described.

A combined dirt and dress guard is comprised in the peripherally-disposed shoe S, supported by stay-lugs 43 from the saddle-post and the truss-rods 44, connected thereto and to the rims of segmental plates T, bolted or otherwise attached to the outer sides of of the rear fork-legs. (See Figs. 1 and 2.) The stay or truss rods 44, which may be more or less closely disposed, as desired, prevent, particularly in the use of the machine by a lady, the entanglement of the rider's skirts in the spokes of the rear wheel.

What I claim as my invention is—

1. In combination, the fork-head members $a\ a$, the front wheel fork-legs suitably connected thereto, and the upper and lower bars $d\ d$, uniting said fork-head members, each having an intermediate vertical opening $h$ therein, a threaded nipple having a screw engagement with the one cross-bar opening $h$, and the back-bone stem $g$, having a bearing by its end portions in the other cross-bar opening and in the end of said nipple, substantially as and for the purpose described.

2. In a velocipede, the combination, with the sprocket-wheel axle having the hub enlargement 17, of the ball-bearing supported from the frame and comprising the internal journal-collar or enlargement fitting over said axle and having by its inner end a rib-and-groove engagement with the end of said axle-hub, the sprocket-wheel mounted on said axle and provided with a hub having by its end a rib-and-groove engagement with the outer end of said journal-collar, and means, substantially as described, for maintaining said sprocket-wheel against endwise movement on its axle, substantially as described.

3. The combination, with the pedal-frame M, having at each end thereof the casing-hub 32, of the pedal-shaft L, having at each end thereof a ball-bearing, substantially as described, comprising a journal-collar $t$ thereon, and the split outer box 12, having at said split the radially-extended lugs which pass through a slot in said hub 32, whereby said box is movable with said pedal-frame, the contracting screw or device provided for said lugs, and the plate 34 closing the end of said casing-hub, substantially as described.

4. In a Safety bicycle, the combination, with the rear fork-legs provided with the segmental plates T, of the arc-shaped dirt-guard shoe S, and the truss-rods 44, connecting said shoe and segmental plate, substantially as described.

5. In a Safety bicyle, the combination, with the fork-head having the forwardly-projecting arm 38 and the handle-bars supported thereon, the lever Q, pivoted on said handle-bar, the lever P, pivoted on said arm 38, and the connecting-rod between the ends of said levers Q and P, of a flexible band for operating a brake connected to the end of said lever P, substantially as described.

6. In a Safety bicycle, in combination, the fork-head and the forwardly-projecting arm 38 and the handle-bar supported thereon, the lever Q, pivoted on said handle-bar, the lever P, pivoted on said arm 38, and the connecting-rod between the ends of said levers Q and P, the sprocket-wheel axle provided with a brake-wheel N, a brake-band secured by one end to a stationary part of the machine-frame and by an intermediate portion thereof adapted to engage the periphery of said brake-wheel, thence guided by its forwardly-extended portion on the machine-frame to and attached to the forward end of said lever P, substantially as described.

7. In a Safety bicycle, in combination, the fork-head and the forwardly-projecting arm 38 and the handle-bar supported thereon, the lever Q, pivoted on said handle-bar, the lever P, pivoted on said arm 38, having the bored hub 40, and the connecting-rod secured to the end of said lever Q and passed through said hub and the binding set-screw, the sprocket-wheel axle provided with a brake-wheel N, a brake-band secured by one end to a stationary part of the machine-frame and by an intermediate portion thereof adapted to engage the periphery of said brake-wheel, thence guided by its forwardly-extended portion on the machine-frame to and attached to the forward end of said lever P, substantially as described.

8. In a Safety bicycle, in combination, the fork-head comprising the two members $a\ a$ and the cross-bars $d\ d$, uniting said members, having the intermediate vertical holes $h$, the backbone provided with the tubular stem $g$, bearing in said bars $d$, substantially as described, and guiding-sheaves 36, the sprocket-wheel axle having the brake-wheel thereon, the flexible brake-band secured by one end to a stationary part of the machine-frame and by an intermediate portion adapted to engage the periphery of said brake-wheel, thence forwardly and upwardly guided over said sheaves through the openings in said uniting-bars $d$ and tubular stem to a position adjacent to the fork-head, and a mechanism located on the fork-head to which said brake-band is connected, whereby it may be drawn to a bind on the said brake-wheel, substantially as described.

GEO. T. WARWICK.

Witnesses:
H. A. CHAPIN,
G. M. CHAMBERLAIN.